United States Patent [19]
Dandini

[11] 3,934,573
[45] Jan. 27, 1976

[54] SPHERICAL SYSTEM FOR THE CONCENTRATION AND EXTRACTION OF SOLAR ENERGY

[76] Inventor: Alessandro O. Dandini, 101 Greenridge Drive, Reno, Nev. 89502

[22] Filed: Feb. 28, 1975

[21] Appl. No.: 554,194

[52] U.S. Cl. .................. 126/270; 60/641; 350/167
[51] Int. Cl.² ............................................. F24J 3/02
[58] Field of Search .............. 126/270, 271; 60/641; 350/167; 343/753, 911 R; 136/206

[56] References Cited
UNITED STATES PATENTS

| | | | |
|---|---|---|---|
| 965,391 | 7/1910 | Little | 126/270 |
| 1,093,498 | 4/1914 | Thring | 126/271 |
| 1,658,455 | 2/1928 | Metzech et al. | 126/271 |
| 3,182,654 | 5/1965 | Culling | 126/270 |
| 3,203,167 | 8/1965 | Green, Jr. | 60/641 |
| 3,493,291 | 2/1970 | Webb | 126/270 X |
| 3,587,559 | 6/1971 | Nonaka | 126/271 |

FOREIGN PATENTS OR APPLICATIONS

| | | | |
|---|---|---|---|
| 441,914 | 11/1948 | Italy | 126/271 |
| 971,029 | 9/1948 | France | 126/271 |

Primary Examiner—William F. O'Dea
Assistant Examiner—Peter D. Ferguson
Attorney, Agent, or Firm—Murray K. Hatch

[57] ABSTRACT

A spherical system for the concentration and extraction of solar energy includes a boiler fitted with a heat transfer fluid such as liquid sodium and connectable to means for converting heat energy to electrical energy such as a magneto-hydrodynamic generator. The boiler is surrounded by a concentrically spaced spherical shell having a plurality of aplanatic lenses set into the shell in such manner as to receive and collect the sun's rays onto the boiler. Apparatus is provided for cleaning the exterior of the shell and lenses to facilitate the passage of radiant energy therethrough, this means being shown as comprising a pair of circular conduits supported in concentrically spaced relation to the shell upon carriages movable along a circular trackway so the conduits can rotate around the vertical axis of the shell. Nozzles are carried by and communicate with the interior of the conduit for selectively directing jets of cleaning water and drying air against the surface of the shell as the cleaning unit revolves.

14 Claims, 7 Drawing Figures

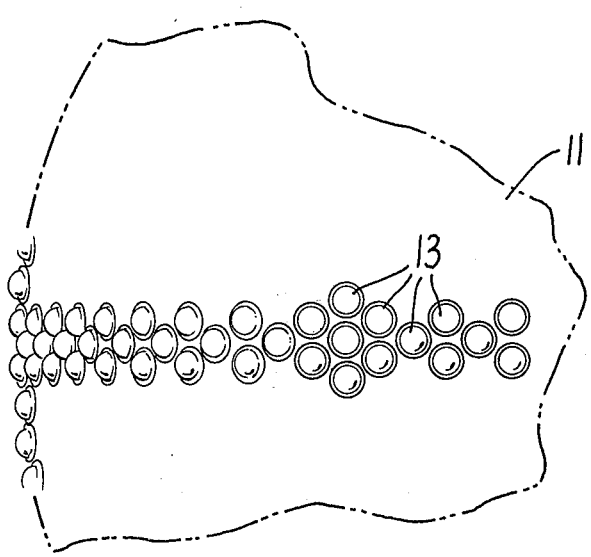
FIG. 4.
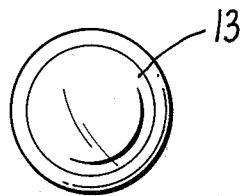
FIG. 5.
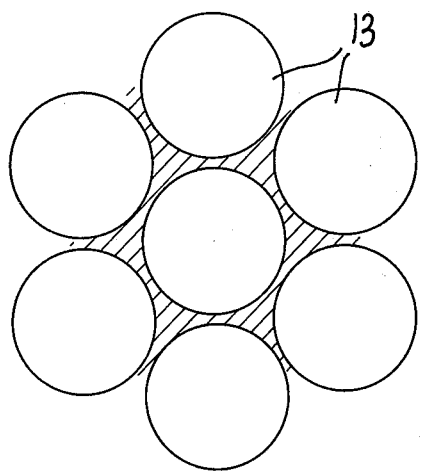
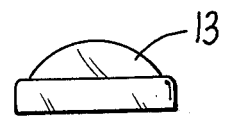
FIG. 6. FIG. 7.

SPHERICAL SYSTEM FOR THE CONCENTRATION AND EXTRACTION OF SOLAR ENERGY

BACKGROUND OF THE INVENTION

The present invention relates to a SPHERICAL SYSTEM FOR THE CONCENTRATION AND EXTRACTION OF SOLAR ENERGY, and more particularly to apparatus for collecting the radiant energy of the sun, concentrating it and supplying it in the form of heat energy to other apparatus for converting the heat energy to useful work.

The system of the present invention is particularly directed to the conservation of fossil and fission energy sources by collecting and converting the radiant energy from the sun into forms useful to man. A number of approaches have been made to the problem of collecting solar energy, but these have largely been impractical for various reasons. Some systems, such as the photo-voltaic cell, have proved to be fairly effective, but the cost is prohibitive for other than highly specialized uses. Mirror and Fresnel lens systems require complicated and expensive heliostat tracking drive systems to keep them pointed to the sun. Other systems require relatively fragile equipment covering large areas of land. All of these systems suffer from the problem of dust, mud and the like obscuring and cutting off the radiant solar energy, thus greatly reducing efficiency.

SUMMARY OF THE INVENTION

The system of the present invention is relatively compact and versatile in nature and the apparatus can be set up and operated in almost any desired location. The solar energy impinges upon a strong and sturdy spherical shell into which a plurality of lenses are inset. These lenses collect the radiant solar energy and concentrate it upon a spherical heat energy receiving element concentrically positioned at the center of the spherical shell.

A heat transfer fluid is piped into the heat energy receiving element to pick up the heat energy directed onto such element by the lenses. The heated fluid is then circulated to apparatus capable of utilizing the heat energy to generate electricity to perform other useful work.

In order to avoid any diminishing of the efficiency of the unit, apparatus is provided for inspecting, washing and drying the exterior surface of the shell and the lenses inset therein. The unit is therefore able to operate at maximum efficiency winter and summer. The solar energy collecting portion of the apparatus is fixed and has no moving parts other than the fluid circulating through the heat energy receiving element. Therefore, the unit remains operative at all times and impervious to ordinary mechanical breakdowns.

It is therefore a principal object of the invention to provide an improved system for concentrating and extracting solar energy from the rays of the sun and transferring such energy to desired locations in usable form.

Another object of the present invention is to provide a system of the character set forth in which the solar energy receiving structure is spherical in form and is constructed to direct and concentrate the rays of the sun onto a heat energy receiving element positioned at the center of the sphere.

A further object of the invention is to provide a system of the character set forth in which the collection and concentration of the sun's rays is accomplished by a plurality of aplanatic lenses inset into a spherical shell.

A still further object of the invention is the provision, in a system of the character described, of apparatus for inspecting and cleaning the outer surface of the shell and its lenses.

Yet another object of the present invention is to provide a system of the character described in which the solar energy receiving and collecting apparatus is fixed and immovable and thus not subject to equipment breakdowns, maintenance and repair problems.

Further objects and features of advantage will become apparent as the specification progresses, and the new and useful features of the present invention will be defined in the claims.

BRIEF DESCRIPTION OF THE DRAWINGS

The preferred form of the present invention is illustrated in the accompanying drawings, forming a part of this description, in which:

FIG. 4 is an enlarged fragmentary view of a portion of the spherical shell of FIG. 1 illustrating the arrangement of lenses inset therein;

FIG. 5 is a plan view of a preferred form of lens;

FIG. 6 is a side elevational view of the form of the lens illustrated in FIG. 5; and FIG. 7 is a further enlarged schematic view of the arrangement of lenses illustrating the effective use of surface area.

Figure 1:
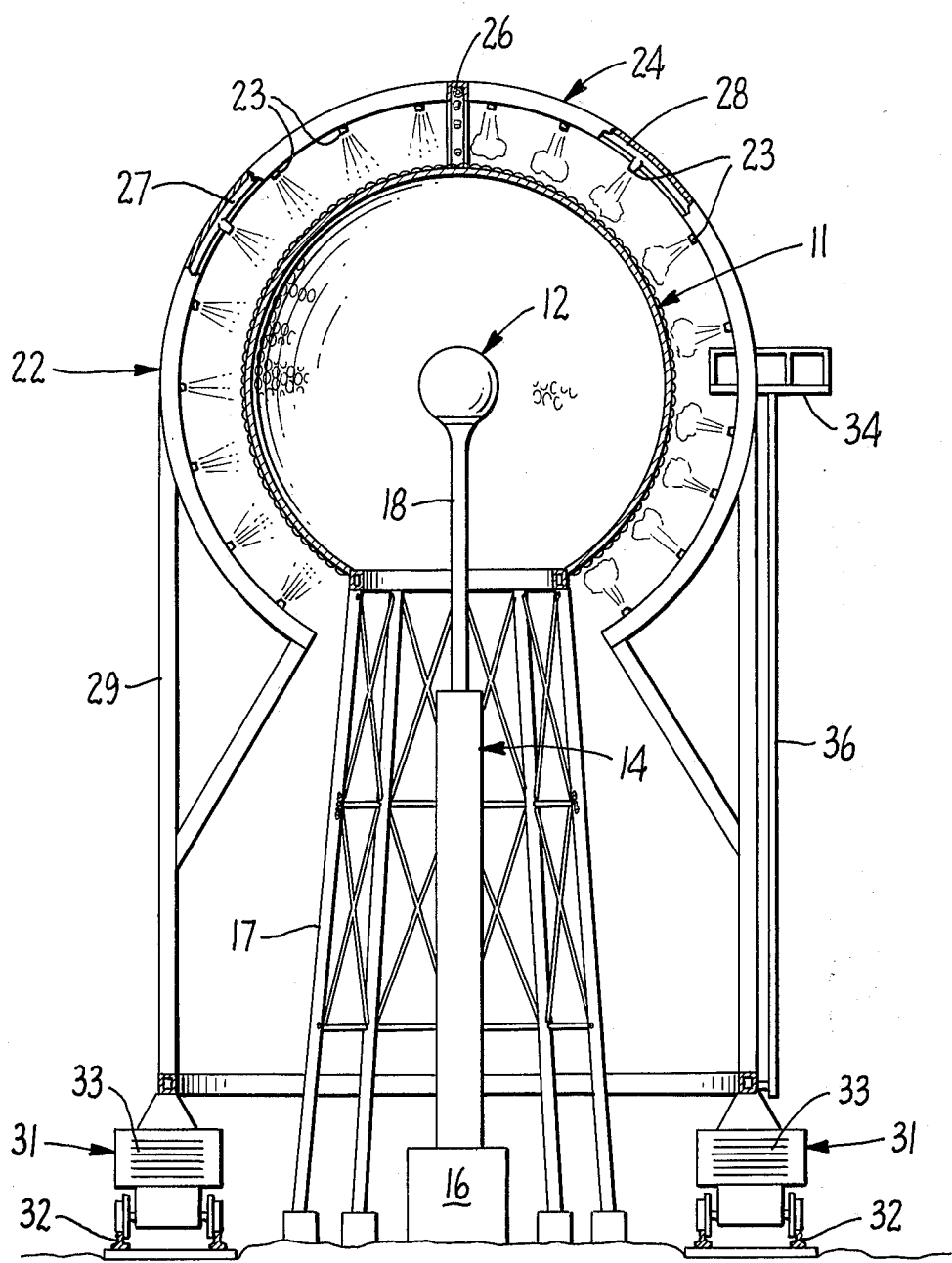
FIG. 1 is a vertical, cross-sectional view of a spherical system for the concentration and extraction of solar energy constructed in accordance with the present invention.

While only the preferred form of the invention has been shown, it should be understood that various changes or modifications may be made within the scope of the claims without departing from the spirit of the invention.

DESCRIPTION OF THE PREFERRED EMBODIMENT

Referring to the drawings in detail, it will be seen that the apparatus for the concentration and extraction of solar energy of the present invention herein includes a generally spherical member 11 mounted to receive the rays of the sun, a heat energy receiving element 12 positioned at the center of the spherical member 11, a plurality of lenses 13 in said spherical member formed for concentrating and directing heat energy radiation impinging said spherical member 11 onto said heat energy receiving element 12, together with means 14 connected to said heat energy receiving element for receiving heat energy therefrom and adapted for connection to equipment 16 for utilizing such heat energy to perform work.

The spherical member 11 is preferably in the form of a thin shell supported on a framework 17 in concentrically spaced relation to the heat energy receiving element 12, the latter being supported at the geometrical center of shell 11 on a vertical standard 18.

Figure 3:
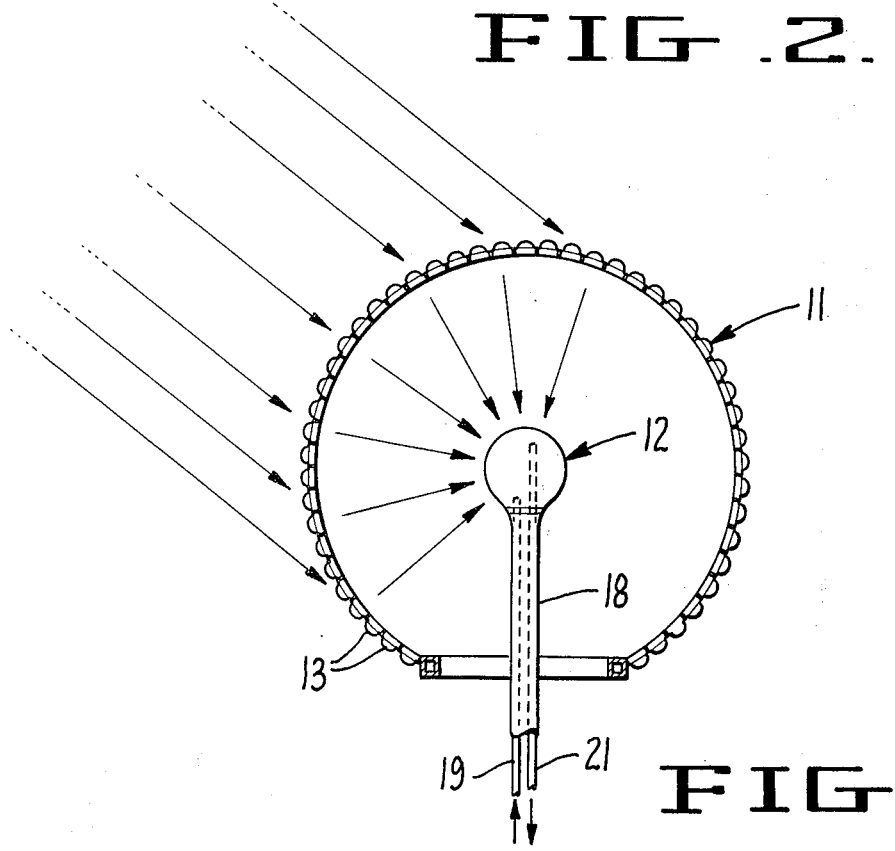
FIG. 3 is a schematic view of solar energy receiving collection portion of the apparatus of FIG. 1 and illustrating the concentrating of the sun's rays onto a heat energy receiving element positioned at the center of the spherical shell.

The lenses 13 are inset in closely spaced relation in the shell 11, see FIGS. 5 and 7. By arranging the lenses in clusters, as illustrated in FIG. 7, only about 4% of the area of the cluster is lost. The lenses 13 are preferably substantially aplanatic in form, free of spherical aberration, for focusing the radiant solar energy on the heat energy receiving element 12. As may be seen from FIG. 3 of the drawings, as the angle of incidence of the sun's rays with respect to lenses 13 varies because of the apparent movement of the sun across the sky, the lenses 13 still concentrate and direct the heat energy radiation received from the sun onto the heat energy receiving element 12.

The lenses 13 may be of any suitable convergent form capable of concentrating and focusing the sun's rays onto the element 12. Because element 12 is preferably spherical and concentric with shell 11, an aplanatic lens is preferred. A recent lens development, known as a trilobite lens, is capable of more accurately focusing the sun's rays on the target, whatever its aspect. The trilobite lens is illustrated in FIGS. 5 and 6 of the drawings. Other types of aplanatic lenses, such as Cartesian lenses and octagonal prismatic and even non-aplanatic lenses, may be found useful in the concentric spherical system of the present invention.

As here shown, the element 12 is preferably also spherical in shape and is concentric with the shell 11. As the rays of the sun are focused by the lenses 13 onto the element 12, the surface thereof heats up to perhaps 1000°, and this heat energy is conducted to the interior of the element 12 where it imparts thermal energy to a heat transfer fluid contained in the boiler-like element 12. The spherical element 12 may be coated on the outside with a heat-absorbing layer and may have a thin film metallic coating on the inside to prevent trapped heat energy from radiating back out.

The heat transfer fluid may comprise any suitable liquid or gas capable of performing the described function. However, for reasons of efficiency and versatility, it is preferred to use liquid sodium as the heat transfer fluid. As may be seen in FIG. 3 of the drawings, relatively cool heat transfer fluid is piped into the lower part of the boiler 12 through an intake conduit 19, and the heated fluid is removed from the upper part of the boiler through a discharge conduit 21. The heated fluid, which may attain temperatures on the order of 1000°F, passes through means 14 to means 16 where the thermal energy is utilized to perform useful work. The means 16 conveniently may generate steam under pressure by use of a conventional heat exchanger or steam boiler, or the thermal energy may be used to generate electricity either through a steam turbine and generating system or a magneto-hydrodynamic generator.

Figure 2:
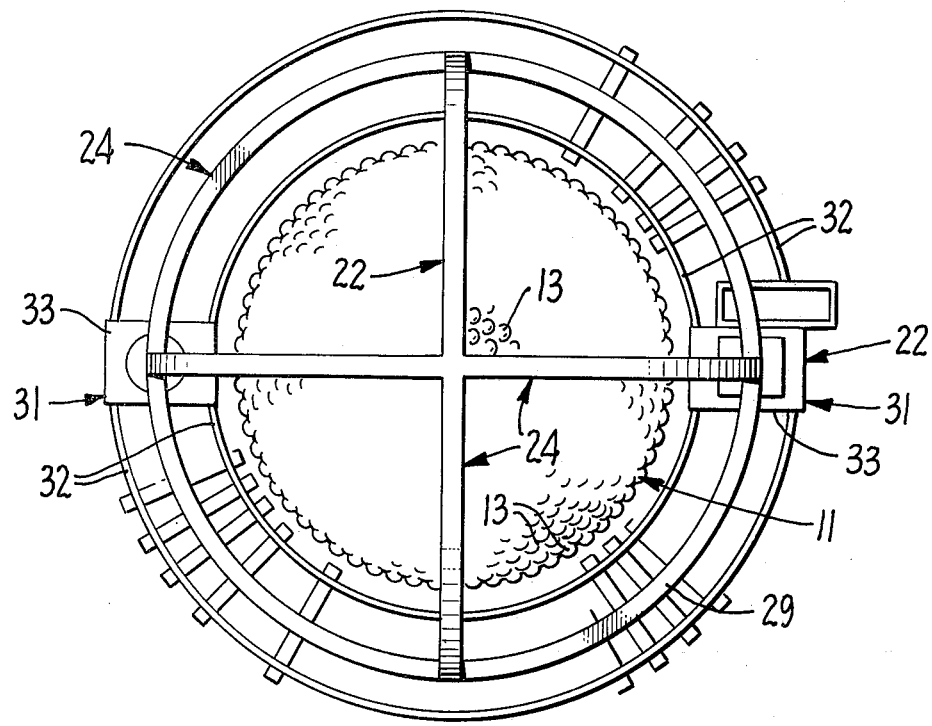
FIG. 2 is a plan view of the system of FIG. 1.

In accordance with the present invention, cleaning means 22 is provided for removing from the exterior surface of the spherical shell 11 and its lenses 13 any dust or other materials which might impede free passage of the rays of the sun through the lenses. As shown in FIGS. 1 and 2 of the drawings, the cleaning means 22 is formed for washing and drying the exterior surface of the spherical shell and the lenses carried thereby. This washing and drying action is accomplished by a plurality of fluid jet nozzles 23 mounted on frame means 24 and inwardly directed toward the exterior surface of the spherical shell 11.

As here shown, the frame means 24 provides a generally circular conduit carried in concentrically spaced relation to the exterior of the shell 11, with the fluid jet nozzles 23 being mounted on and communicating with the interior of the conduit 26.

As may best be seen in FIG. 1 of the drawings, the conduit 26 preferably is formed in two sections at opposite sides of the shell with one section 27 being adapted for a connection to a source of water under pressure and the other section 28 being adapted for connection to a source of air under pressure. Suitable cleaning agents, such as detergents, may be added to the cleaning water and, if desired, the water and/or air may be heated.

In order to provide coverage of the entire exterior surface of the shell 11, the conduit 26 is concentric thereto and is formed to rotate around the vertical axis of the shell. For this purpose, the conduit 26 is carried on a supporting structure 29 mounted on carriages 31 running on a circular track 32 and having drive means 33 for selectively moving the carriages on the track.

Inspection and/or repair of the shell 11 and lenses 13 is accomplished from a platform 34 mounted for vertical and radial movement on a support 36.

From the foregoing, it will be seen that the spherical system for the concentration and extraction of solar energy of the present invention provides a compact and sturdy structure which may be kept at optimal operating efficiency with a minimum of maintenance and repair.

I claim

1. Apparatus for collecting solar energy, comprising a generally spherical member mounted to receive the rays of the sun,
a heat energy receiving element positioned at the center of said spherical member,
a plurality of lenses in said spherical member formed for concentrating and directing heat energy radiation impinging said spherical member onto said heat energy receiving element,
and means connected to said heat energy receiving element for receiving heat energy therefrom and adapted for connection to equipment for utilizing such heat energy to perform work.

2. Apparatus as described in claim 1 and wherein said lenses are substantially aplanatic and are of trilobite form.

3. Apparatus as described in claim 1 and wherein said heat energy receiving element is substantially spherical in shape.

4. Apparatus as described in claim 3 and wherein said heat energy receiving element comprises a pressurized boiler.

5. Apparatus as described in claim 4 and wherein said heat energy receiving element utilizes a heat transfer fluid, and is provided with inlet and outlet passages for circulating said fluid through said element to pick up said heat energy directed onto said element by said focusing lenses.

6. Apparatus as described in claim 5 and wherein said heat transfer fluid is liquid sodium.

7. Apparatus as described in claim 1 and wherein said spherical member is provided with cleaning means for removing from the exterior surface thereof any dust and other materials impeding receipt of the rays of the sun.

8. Apparatus as described in claim 7 and wherein said cleaning means is formed for washing and drying the exterior surface of said spherical member and the lenses thereon.

9. Apparatus for the concentration and extraction of solar energy, comprising
a generally spherical member having a supporting tower,
a plurality of convergence lenses inset into said spherical member and formed for receiving and focusing the rays of the sun onto an area at the center of said spherical member,
a spherical boiler having a supporting standard and positioned in said area for receiving the focused rays of the sun from said lenses,
frame means in spaced relation to the exterior of said spherical member,
and a plurality of fluid jets carried on said frame means and inwardly directed toward said spherical member for effecting cleaning of said lenses.

10. Apparatus as described in claim 9 and wherein said spherical member comprises a shell of generally spherical form and said lenses are inset into said shell.

11. Apparatus as described in claim 10 and wherein said frame means provides a generally circular conduit carried in concentrically spaced relation to the exterior of said shell, and said fluid jets are provided by nozzles mounted on and communicating with the interior of said conduit.

12. Apparatus as described in claim 11 and wherein said conduit is formed in two sections at opposite sides of said shell with one section adapted for connection to a source of water under pressure and the other section adapted for connection to a source of air under pressure.

13. Apparatus as described in claim 11 and wherein said conduit is formed to rotate around the vertical axis of said shell.

14. Apparatus as described in claim 12 and wherein said conduit is formed to rotate around the vertical axis of said shell, said conduit is carried on a supporting structure having carriages running on a circular track, and drive means is provided for selectively moving said carriages on said track.

* * * * *